United States Patent [19]

Takasaki

[11] Patent Number: 5,369,517
[45] Date of Patent: Nov. 29, 1994

[54] OPTICAL SUBSCRIBER NETWORK TRANSMISSION SYSTEM

[75] Inventor: Yoshitaka Takasaki, Tokorozawa, Japan

[73] Assignee: Hitachi, Ltd., Tokyo, Japan

[21] Appl. No.: 806,386

[22] Filed: Dec. 13, 1991

Related U.S. Application Data

[63] Continuation of Ser. No. 512,628, Apr. 19, 1990, Pat. No. 5,175,639, which is a continuation-in-part of Ser. No. 123,463, Nov. 20, 1987, abandoned.

[30] Foreign Application Priority Data

Nov. 21, 1986 [JP] Japan ................. 61-276557

[51] Int. Cl.$^5$ ............................................ H04B 10/12
[52] U.S. Cl. .................................... 359/161; 359/113; 359/173
[58] Field of Search ............... 359/118, 125, 161, 173, 359/127, 113, 114; 370/16

[56] References Cited

U.S. PATENT DOCUMENTS 5,175,639 12/1992 Takasaki ........................... 359/118

OTHER PUBLICATIONS

Lin, "Passive Optical Subscriber Loops with Multiaccess" Journal of Lightwave Technology, Nov. 7, 1989 #11.
Stauffer, "FT3C-A Lightwave System for Metropolitan and Intercity Applications"; IEEE Journal on Selected Area in Communications vol. SAC-1 #3 pp. 413-419, Apr. 1983.

Primary Examiner—Leslie Pascal
Attorney, Agent, or Firm—Pennie & Edmonds

[57] ABSTRACT

The invention relates to an optical subscriber network transmission system and, in particular, means for smoothly enlarging the transmission capacity in such system. The invention shortens the time of service interruption during changeover of transmission line capacities by use of a spare optical transmission line. Installation of a low cost spare optical fiber line permits testing of transmission lines without service interruption. Successive changeovers are performed using the auxiliary fiber keeping service interruption to a minimum.

3 Claims, 7 Drawing Sheets

OPTICAL SUBSCRIBER NETWORK TRANSMISSION SYSTEM

This is a continuation of application Ser. No. 07/512,628, filed Apr. 19, 1990, now U.S. Pat. No. 5,175,639, which is a continuation-in-part of application Ser. No. 07/123,463, filed Nov. 20, 1987, now abandoned.

BACKGROUND OF THE INVENTION

The present invention relates to an optical subscriber network transmission system, and more particularly to a network transmission system which is well suited to smoothly enlarge a transmission capacity in the case where information of large capacity is offered to subscribers by the use of single-mode optical fibers.

Figure 1:
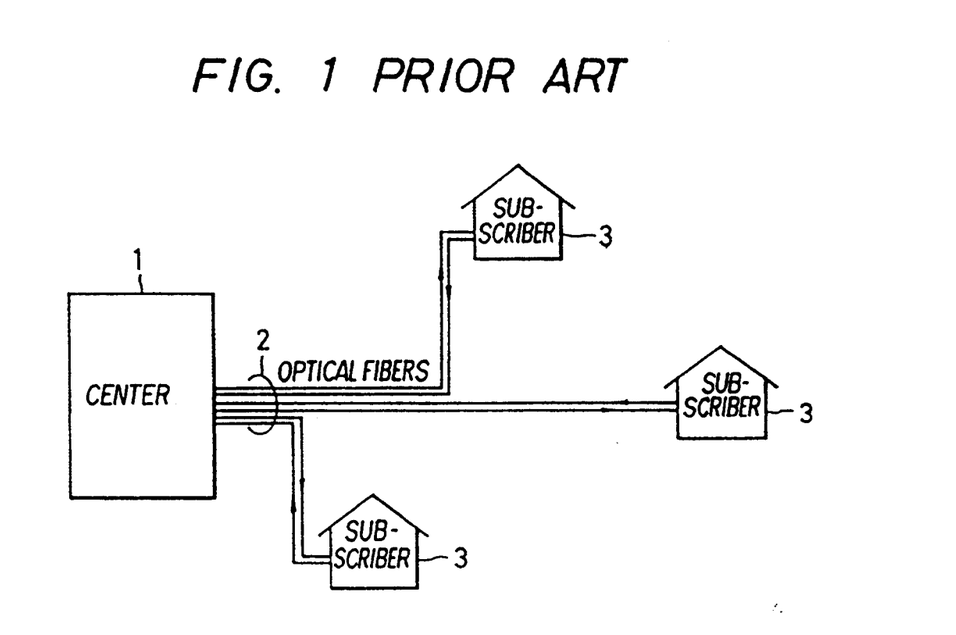
FIG. 1 is a diagram showing an example of arrangement of an optical subscriber network to which the present invention is applied.

An example of a network which offers various services with optical fibers, is shown in FIG. 1. Service information items are transmitted from a center 1 to individual subscribers 3 through optical fibers 2. As the contents of the services, there are mentioned conventional audio-telephone, and besides, facsimile, pay TV, high-definition TV, etc. A system of this type is described in, for example, "Integrated Circuit for Broad-Band Communications Systems" by H. Reiner, IEEE JOURNAL ON SELECTED AREA IN COMMUNICATIONS, VOL. SAC-4, NO. 4, July 1986, pp. 480–487.

The services can be classified into symmetric and asymmetric types. That is, the services such as telephone and facsimile in which the information rates of a transmission line from the center to each subscriber (downstream transmission line) and a transmission line from the subscriber to the center (upstream transmission line) are equal to each other are called the symmetric type, while the services such as pay TV and high-definition TV in which the capacity of the downstream transmission line is larger are called the asymmetric type.

In general, in an optical subscriber system, the symmetric and asymmetric services are multiplexed and then transmitted by the upstream and downstream transmission lines. Therefore, the transmission capacity of the downstream transmission line becomes larger than that of the upstream transmission line.

In addition, single-mode fibers of very broad band are employed for the transmission of signals between the center and the subscriber. Therefore, even when the subscriber wishes the offer of services having a still larger capacity of information in the future, only a transmitter and a receiver may be replaced with ones for the transmission of the larger capacity of information while the laid fibers are used as they are.

In this case, a measure in which a transmitter and a receiver having been used for the downstream transmission line are diverted to the upstream transmission line and in which a transmitter and a receiver of larger capacity are installed anew for the downstream transmission line, is more economic owing to the effective utilization of the existing facilities than a measure in which transmitters and receivers are installed anew for both the upstream and downstream transmission lines. This will be elucidated with reference to FIGS. 2(a) and 2(b).

Figure 2A:
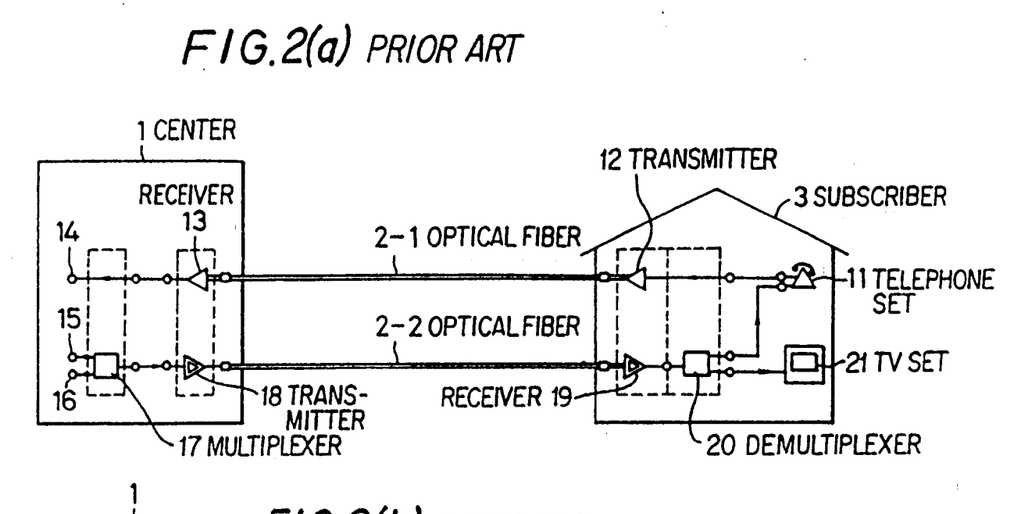
FIGS. 2(a) and 2(b) are diagrams respectively showing examples of transmission line arrangements before and after the enlargement of a service capacity in the case where a specified subscriber is taken out from FIG. 1 and is viewed.

FIG. 2(a) shows the connection sides between the center 1 and the subscriber 3 in the case where telephone and pay TV are subscribed to. Via the optical fiber 2-1 of the upstream transmission line, a voice signal from a telephone set 11 is transmitted to the center 1 by a transmitter 12 and is received by a receiver 13.

On the other hand, as regards the downstream transmission line, a voice signal is applied to a terminal 15, while a pay TV signal is applied to a terminal 16, and the signals are multiplexed by a multiplexer 17. The multiplexed signal is transmitted by a transmitter 18 and received by a receiver 19 via the optical fiber 2—2 of the downstream transmission line. The received signal is demultiplexed by a demultiplexer 20 into the voice signal and the pay TV signal, which are respectively applied to the telephone set 11 and a TV receiving set 21.

Figure 2B:
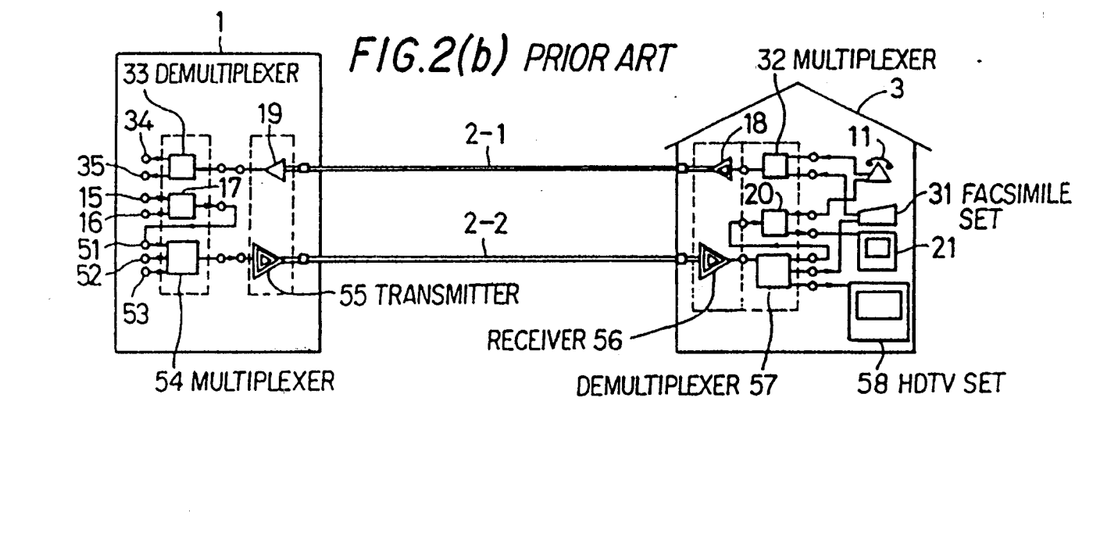

A case where facsimile and high-definition TV are further added to this system, is shown in FIG. 2(b). In this case, the voice signal from the telephone set 11 and also a facsimile signal from a facsimile set 31 are multiplexed on the upstream transmission line by a multiplexer 32, whereupon the multiplexed signal is transmitted to the center side. On the center side, this signal is demultiplexed into the voice signal and the facsimile signal by a demultiplexer 33.

As regards the downstream transmission line, the multiplexed signal of the voice and pay TV signals as applied to the terminal 51 of a multiplexer 54, a facsimile signal applied to the terminal 52 thereof and a high-definition TV signal applied to the terminal 53 thereof are multiplexed and then transmitted. The multiplexed signal is demultiplexed by a demultiplexer 57 on the reception side, and the demultiplexed signals are applied to the respective receiving sets.

In changing-over the system of FIG. 2(a) to that of FIG. 2(b), it is economical that the transmitter and receiver 18, 19 for the downstream transmission line of the system in FIG. 2(a) are diverted for the upstream transmission line of the system in FIG. 2(b). On account of a change-over work, however, the operation of the system needs to be stopped for a considerably long term. More specifically, in the system of FIG. 2(a), the transmitter 18 and the receiver 19 are detached and are respectively substituted for the transmitter 12 and the receiver 13, whereupon the transmission line is tested. Next, the multiplexers 32 and 33 are added to the transmission line as illustrated in FIG. 2(b), and the overall test of the upstream transmission line is conducted. In addition, a transmitter 55 and a receiver 56 are added anew to the optical fiber 2—2 of the downstream transmission line, and a transmission test is conducted. Thereafter, the multiplexer 54 and the demultiplexer 57 are added, and the overall test of the downstream transmission line is conducted. Lastly, the overall test of the upstream and downstream transmission lines is conducted. When the tests in such a procedure are collectively executed for several subscribers or ten odd subscribers, it is sometimes the case that the interruption of the services for a week or so is necessitated.

SUMMARY OF THE INVENTION

An object of the present invention is to shorten to the utmost the term of the service interruption in the change-over of the transmission line capacities as stated above.

As will be described later, the aforementioned problem is solved in such a way that, separately from optical transmission lines for transmission and reception, a spare optical transmission line is laid beforehand. These optical transmission lines are constructed of, for example, optical fibers.

According to the present invention, a spare fiber is prepared. For this reason, three optical fibers are required for each subscriber though two optical fibers have hitherto been sufficient. In recent years, however, the cost of the optical fibers has been rapidly lowering. Since the optical fibers are collectively laid as a cable, the increase of cost attributed to the increased number of the optical fibers is as slight as almost negligible when compared with the cost of the cable and the expense of a work for laying the cable. To the contrary, a cost reduction effect is much more important, the effect being based on such a merit that the term of a change-over work is shortened by the use of the spare fiber.

Thus, a part of a new transmission line is constructed using the spare fiber, and the test of the new transmission line is completed without interrupting any service. Thereafter, the service of an existing transmission line is switched to the new transmission line. Subsequently, the fiber of the existing transmission line, which is now unnecessary for this transmission line, is used as an auxiliary fiber, and successive change-over operations are performed. In this way, the interruption of services can be suppressed to the minimum.

PREFERRED EMBODIMENTS OF THE INVENTION

Figure 3:
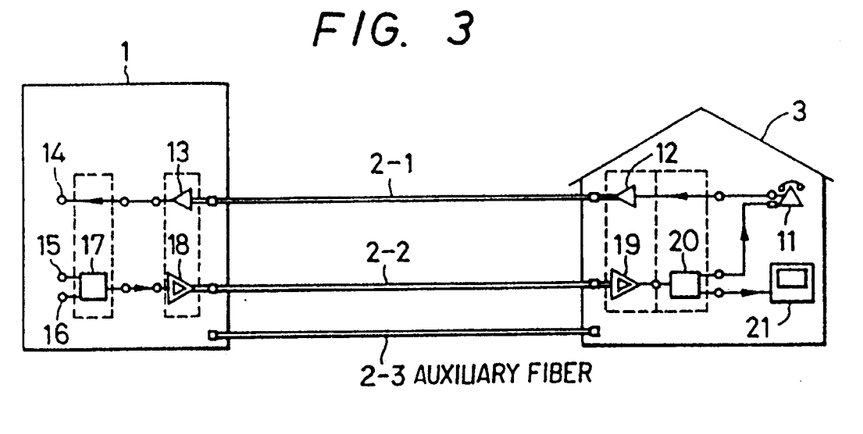
FIG. 3, FIGS. 4(a)-4(c) and FIGS. 5(a)-5(c) are diagrams each showing an embodiment of the present invention.

The foregoing principle will be described with reference to FIG. 3. First, using a spare fiber 2-3, a transmission line (a second downstream transmission line) which is larger in capacity than a downstream transmission line including an optical fiber 2-2 is constructed. Needless to say, the test of the second line does not require the interruption of any service. Since the second downstream transmission line can transmit also the information of the first downstream transmission line, a service can be continued by switching it to the second line immediately at the end of the test. Subsequently, the optical fiber 2-2 of the first downstream transmission line, which is now unnecessary for this transmission line, can be used as an auxiliary fiber to construct a second upstream transmission line. In this case, when the second upstream transmission line is constructed by substituting a transmitter 18 and a receiver 19 for a transmitter 12 and a receiver 13, respectively, an economical effect owing to the effective utilization of the existing facilities is attained. After the test of the second upstream transmission line comprehensive of a demultiplexer is ended, the service of the first upstream transmission line can be borne by a part of the second upstream transmission line.

Thus, increases in the capacities of the transmission lines can be achieved without the interruption of any service or with a service interruption of very short time. An optical fiber 2-1 for the first upstream transmission line, which is now unnecessary, can be used as a spare fiber for a further service enlargement in the future.

Now, an embodiment of the present invention will be described with reference to FIGS. 4(a)-4(c).

Figure 4A:
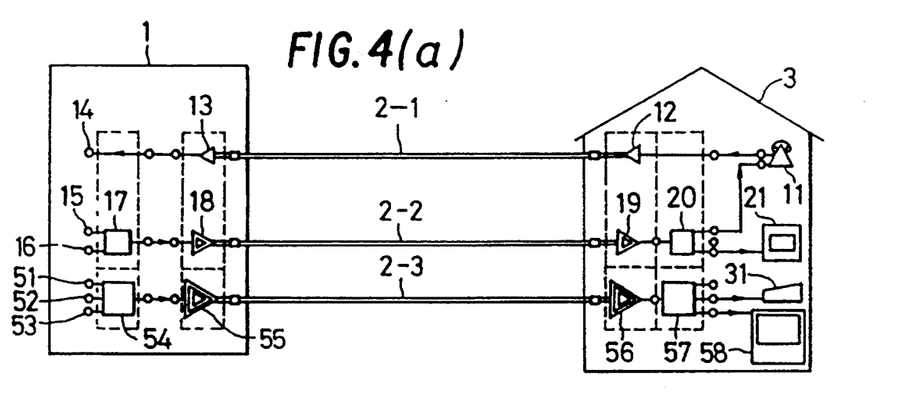

FIG. 4(a) shows an example in which a second downstream transmission line is constructed using a spare fiber 2-3. A multiplexer 54 on a transmission side has three input terminals. When the output of a multiplexer 17 is connected to the terminal 51, the services of a first downstream transmission line can be included in and transmitted by the second downstream transmission line. In this example, the terminal 52 is for a facsimile signal, and the terminal 53 is for a high-definition TV signal. The output signal of the multiplexer 54 is applied to a transmitter 55. This transmitter can transmit signals of larger capacity than a transmitter 18. The multiplexed signal is received by a receiver 56, the capacity of which is of course designed to be larger than that of a receiver 19. The received signal is demultiplexed by a demultiplexer 57, and the resulting signals are respectively applied to a facsimile set 31 and a high-definition TV receiving set. The second downstream transmission line can be tested without interrupting the services of a first upstream transmission line and the first downstream transmission line. The test can be conducted in such a way that a circuit equivalent to a demultiplexer 20 is connected to the first output terminal of the demultiplexer 57 in dummy fashion.

Figure 4B:
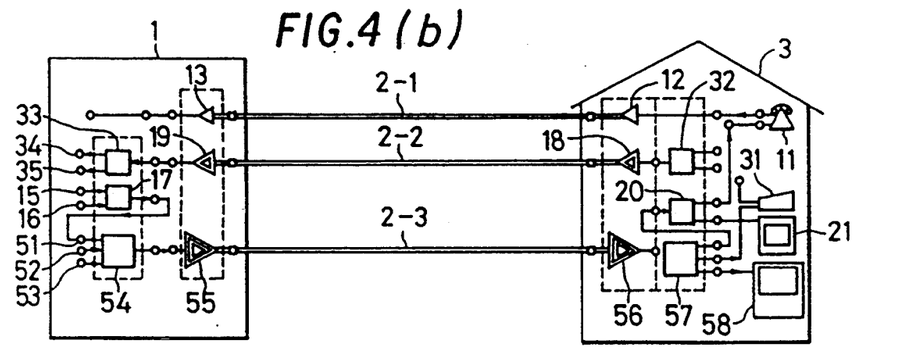

A state in FIG. 4(b) is such that, in the example of FIG. 4(a), the output terminal of the multiplexer 17 is connected to the input terminal 51 of the multiplexer 54, while the input terminal of the demultiplexer 20 is connected to the first output terminal of the demultiplexer 57. Through the simple change-over, the services can be continued as they are.

Meanwhile, the first downstream transmission line having been connected by an optical fiber 2-2 has the transmitter 18 attached to the subscriber side and the receiver 19 attached to the center side in a manner to be replaced with each other, and it is separately prepared as a second upstream transmission line. A multiplexer 32 for multiplexing voice and facsimile signals is added to the subscriber side, while a demultiplexer 33 for demultiplexing both the signals is added to the center side, and these components are tested independently of the actual transmission lines.

Figure 4C:
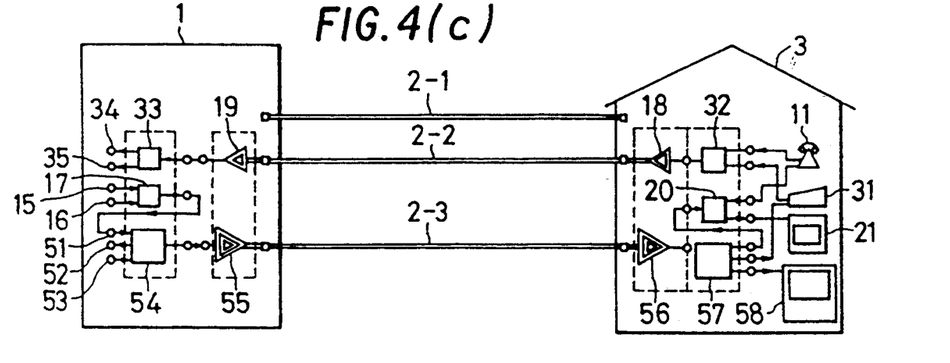

FIG. 4(c) shows a state in which, in FIG. 4(b), the output terminals of a telephone set 11 and the facsimile set 31 on the subscriber side are connected to the input terminals of the multiplexer 32, while the output side of the demultiplexer 33 of the center is connected to an exchange etc. separately installed within the center. Such changeover can be effected without almost no interruption of the services. Thus, the work of changingover the upstream transmission line from the first transmission line to the second transmission line of larger capacity is completed.

Incidentally, an optical fiber 2-1 which is now unnecessary can be used as a spare fiber for a further system enlargement at the next time.

It will be understood that, when the spares of the transmitter 18 and the receiver 19 can be used, the change-over can be executed at a time by the use of two spare fibers.

Figure 5A:
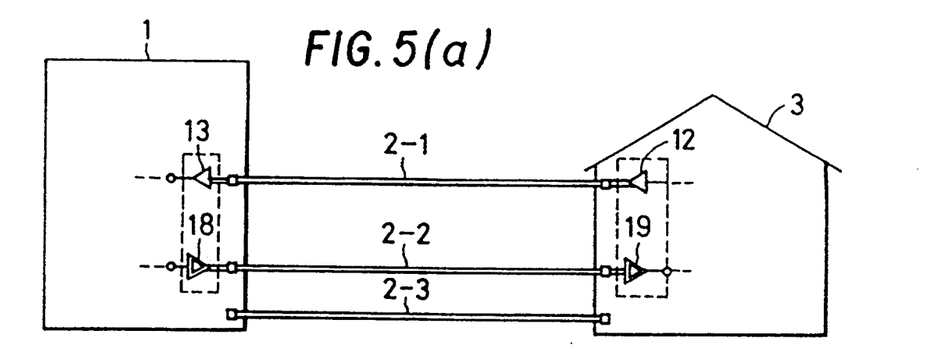

Moreover, the number of fibers to be used can be reduced using wavelength division multiplexers. This will be described with reference to FIGS. 5(a)–5(c). FIG. 5(a) shows the already-explained example which uses the three fibers. In case of employing two-wavelength division multiplexers 60 and 61 as shown in FIG. 5(b), the same effect can be produced with only two fibers.

Figure 5B:
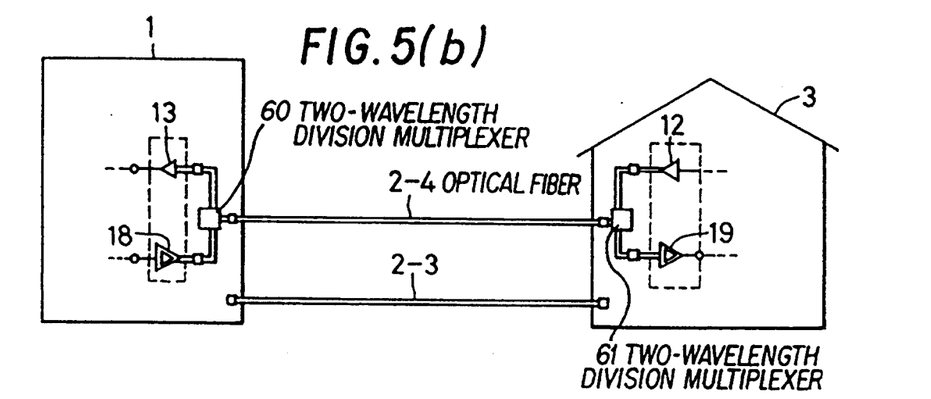
Figure 5C:
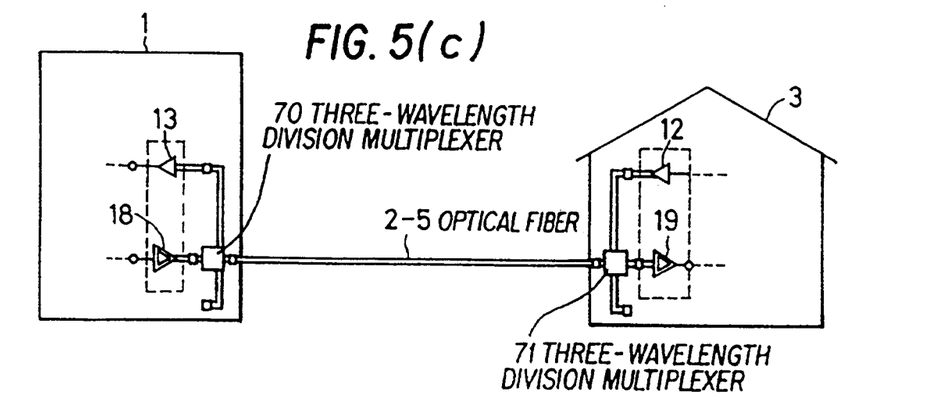

It will also be understood from FIG. 5(c) that a single fiber suffices when three-wavelength division multiplexers 70 and 71 are employed.

Whether the scheme of FIG. 5(b) or that of FIG. 5(c) is adopted, depends upon the prices of the wavelength division multiplexers. In a case where the difference of the prices of the two-wavelength division multiplexers and the three-wavelength ones is less than the price of one optical fiber, the adoption of the scheme of FIG. 5(c) is more advantageous.

Besides, in a case where, even when any optical transmission line is not prepared beforehand, optical wavelength division multiplexers can be inserted so simply that the period of time of service interruption is negligible, the same effect as in the foregoing can be attained by constructing an auxiliary optical transmission line.

As described above, the present invention is very greatly effective in that a change-over work for enlarging the capacity of a subscriber, which has hitherto been supposed to be attended with a service interruption of several weeks in some cases, can be realized with an almost negligible interruption.

When the distances between the center and the subscribers are fairly short, the overall cost increase due to the addition of the auxiliary optical fiber is negligibly small. However, when the distances are rather long the increased cost has greater influence.

Figure 6:
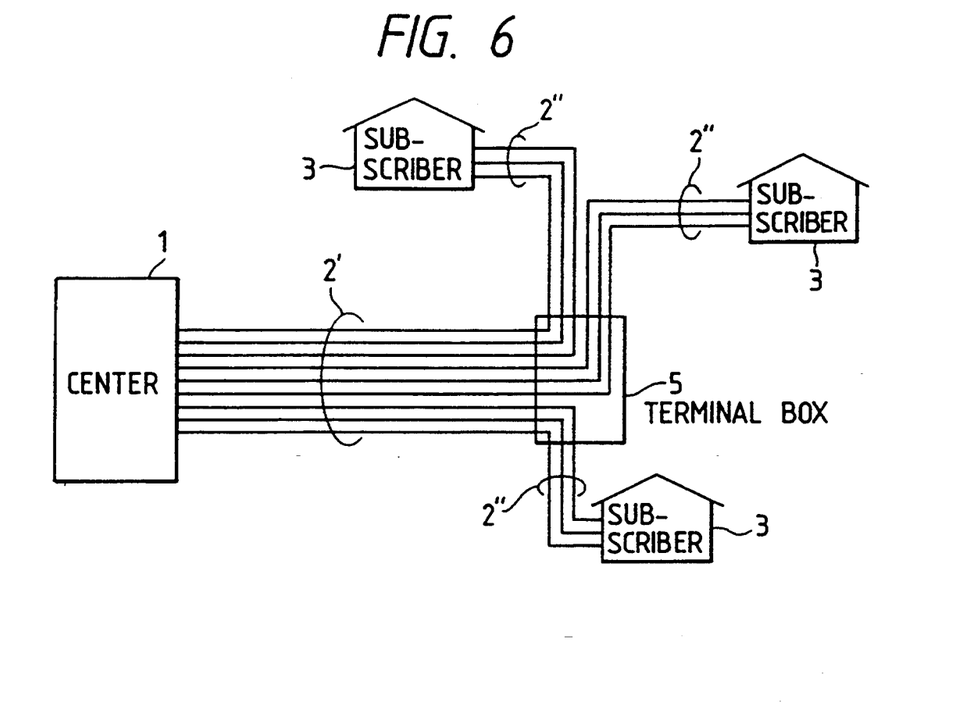
FIG. 6 shows an embodiment of the present invention having an individual auxiliary line for each subscriber.

That is, in the case where one auxiliary optical fiber is provided for each of the subscribers, as shown in FIG. 6, since ordinarily the distances from the terminal box 5 to the subscriber 3 are relatively short, the increase in the cost of the fibers 2″ is negligibly small compared with the cost of the system. On the other hand, when the distance from the center 1 to the terminal 5 is long, the cost of the auxiliary optical fiber per subscriber becomes much higher.

As shown in FIG. 6, the optical fibers between the center 1 and the terminal box 5 are encased in a cable. Therefore, by the common use of fibers such as an auxiliary fiber which is temporarily used only for system extension, a more economical system can be established as compared to systems in which auxiliary fibers are permanently installed In FIG. 6, three auxiliary fibers connected to different subscribers are provided in the section from the center 1 to the terminal box 5. However, even in the case of a long distance extending from the center 1 to the terminal box 5, the increased cost can be minimized by providing only one auxiliary fiber between the center 1 and the terminal box 5 for common use by a plurality of the subscribers. An embodiment of such a system will be described in reference to FIG. 7.

Figure 7:
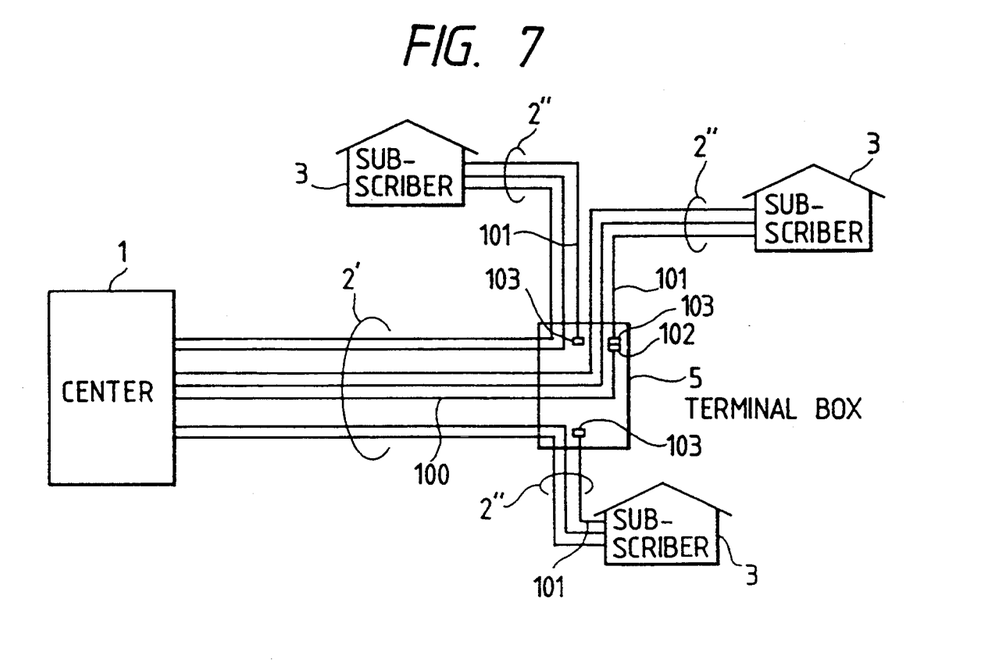
FIG. 7 shows an embodiment of the present invention using a common auxiliary line.

The system of FIG. 7 has a common auxiliary fiber 100 connected to an exclusive auxiliary fiber 101 through connectors 102 and 103. With this, the line test on the system extension is carried out. After the test, even when the common auxiliary fiber 100 is not used for transmission, the fiber 100 can be used again for the extension test for a new subscriber.

Figure 8:
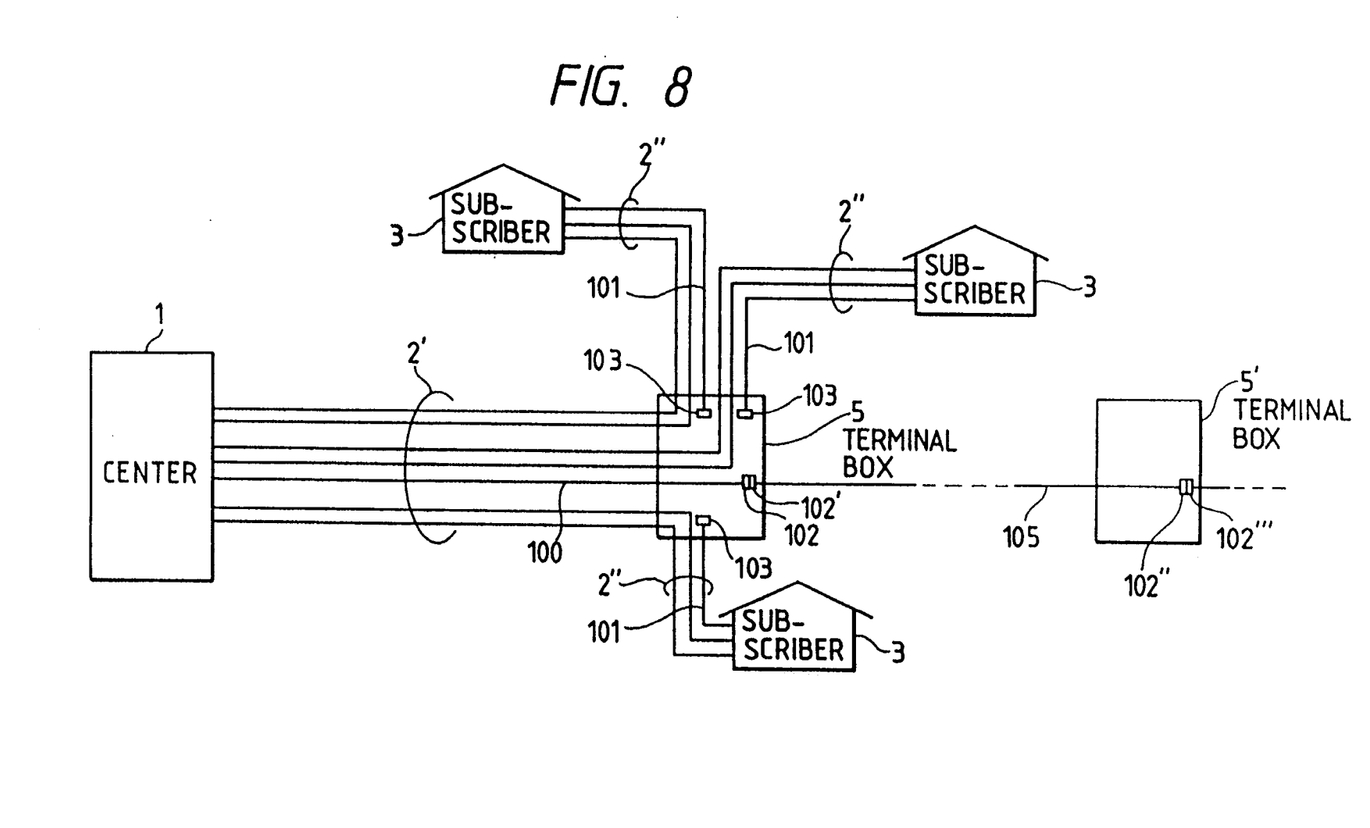
FIG. 8 shows an embodiment of the present invention having a second extended auxiliary line.

Referring now to FIG. 8, another embodiment is shown in which a common auxiliary fiber 100 is connected to another common auxiliary fiber 105 through connectors 102 and 102′. Accordingly, with the terminal box 5′, the line test for a further system extension can be done. The fiber 105 also can be connected to another common auxiliary fiber through connectors 102″ and 102‴ and be used for the line test of a system extension at the next terminal box.

In the above description, only the auxiliary fibers are connected through connectors. Obviously, it is possible to provide a more flexible system by connecting the existing fibers through connectors.

Even though only one common auxiliary fiber is provided, a plurality of auxiliary fibers can be laid for a more efficient system extension.

As will be understood from the above, according to the present invention, even though the distance between the center 1 and the terminal box 5 is rather long, an economical system can be achieved, providing substantial practical benefits.

What is claimed is:

1. An optical network system comprising:

a center having a first transmitter, a second transmitter, a first receiver, a second receiver, and at least one auxiliary line termination point;

a first subscriber and a second subscriber, each having a transmitter, a receiver and at least one auxiliary line termination point;

a first downstream optical transmission line for transmitting information from said first center transmitter to said first subscriber receiver;

a second downstream optical transmission line for transmitting information from said second center transmitter to said second subscriber receiver; p1 a first upstream optical transmission line for transmitting information from said first subscriber transmitter to said first center receiver;

a second upstream optical transmission line for transmitting information from said second subscriber transmitter to said second center receiver; and means for replacing the transmitter and receiver connected to any from among said first downstream optical transmission line, said second downstream optical transmission line, said first upstream optical transmission line and said second upstream optical transmission line while maintaining substantially continuous transmission of information between said center and any of said subscribers, comprising:

a terminal box which is remote from said center, said first subscriber and said second subscriber, and having a plurality of auxiliary line termination points;

a first auxiliary optical transmission line extending from one of said center auxiliary line termination points to one of said terminal box termination points, said one center auxiliary line termination point having an open termination;

a second auxiliary optical transmission line extending from another one of said terminal box auxiliary line termination points to said first subscriber auxiliary line termination point, said first subscriber auxiliary line termination point having an open termination;

a third auxiliary optical transmission line extending from yet another one of said terminal box auxiliary line termination points to said second subscriber auxiliary line termination point, said second subscriber auxiliary line termination point having an open termination;

means for selectively connecting said one terminal box auxiliary line termination point to any from among said another one terminal box auxiliary line termination point and said yet another one terminal box auxiliary line termination point to provide a temporary auxiliary transmission line with open termination at both ends.

2. An optical network system according to claim 1, wherein each of said first and second downstream transmission lines, said first and second upstream transmission lines, and said first, second and third auxiliary optical transmission lines is constructed of an optical fiber.

3. An optical network system according to claim 1, wherein said first downstream and said first upstream transmission lines are constructed of a first single optical fiber with two-way multiplexers connected at both ends, and said second downstream and said second upstream transmission lines constructed of a second single optical fiber with two-way multiplexers connected at both ends.

* * * * *